United States Patent
Ting et al.

(10) Patent No.: US 7,250,738 B1
(45) Date of Patent: Jul. 31, 2007

(54) NONLINEAR HYSTERESIS CONTROL SYSTEM

(75) Inventors: Yung Ting, Chung Li (TW);
Hou-Ching Cha, Chung Li (TW);
Chun-Chung Lee, Chung Li (TW)

(73) Assignee: Chung-Yuan Christian University, Tao Yuan County (TW)

( * ) Notice: Subject to any disclaimer, the term of this patent is extended or adjusted under 35 U.S.C. 154(b) by 0 days.

(21) Appl. No.: 11/484,627

(22) Filed: Jul. 12, 2006

(51) Int. Cl.
*H02P 1/46* (2006.01)

(52) U.S. Cl. ............... 318/701; 360/77.05; 360/78.05; 700/86; 702/57; 702/64; 702/79

(58) Field of Classification Search ............... None
See application file for complete search history.

(56) References Cited

U.S. PATENT DOCUMENTS 5,780,777 A * 7/1998 Selig .................. 177/25.11
6,493,177 B1 * 12/2002 Ell et al. ............. 360/78.05

* cited by examiner

*Primary Examiner*—David Bruce
*Assistant Examiner*—Michael Brandt
(74) *Attorney, Agent, or Firm*—Bacon & Thomas, PLLC

(57) ABSTRACT

A nonlinear hysteresis control system for controlling an actuator with nonlinear hysteresis effect is disclosed. An improved extended hysteresis effect profile further stores the displacement when a applied voltage of the actuator is from 0 voltage to a specific voltage and back to that specific voltage. Therefore, the system can be used under the condition of not very slow motion of the actuator.

7 Claims, 12 Drawing Sheets

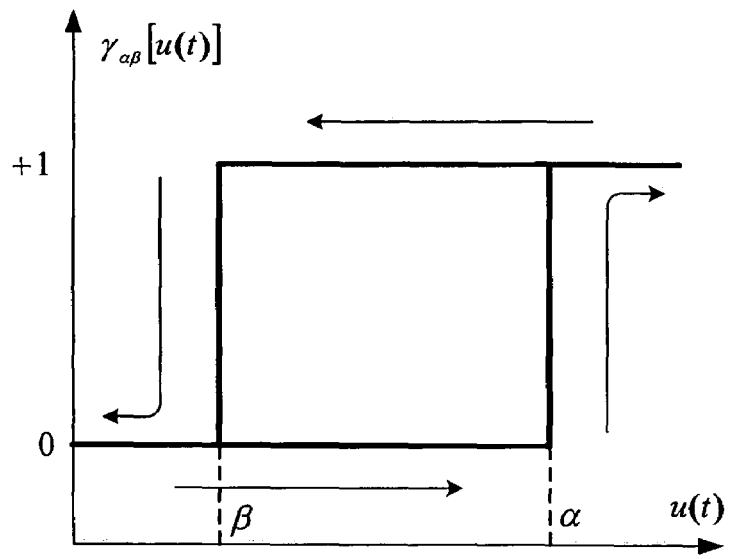
FIG. 4 (Prior Art)
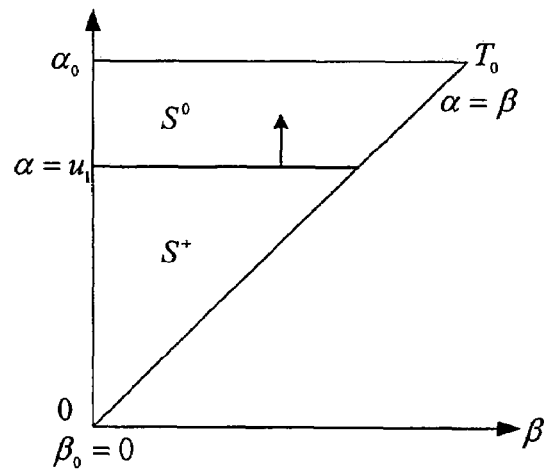 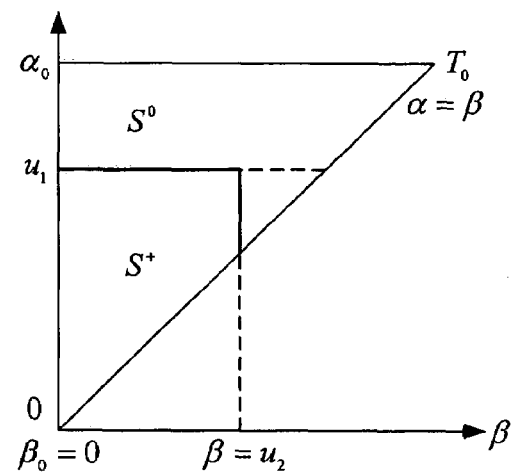
FIG. 5A (Prior Art)   FIG. 5B (Prior Art)

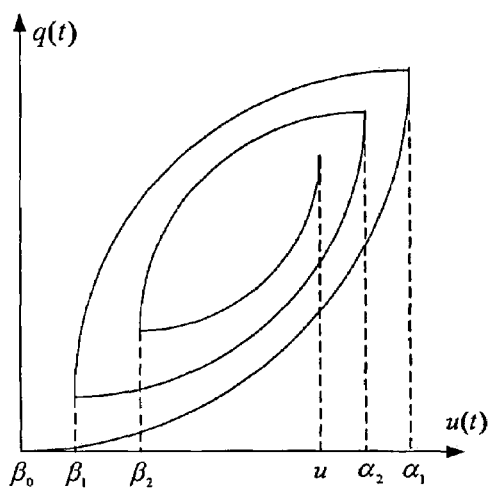
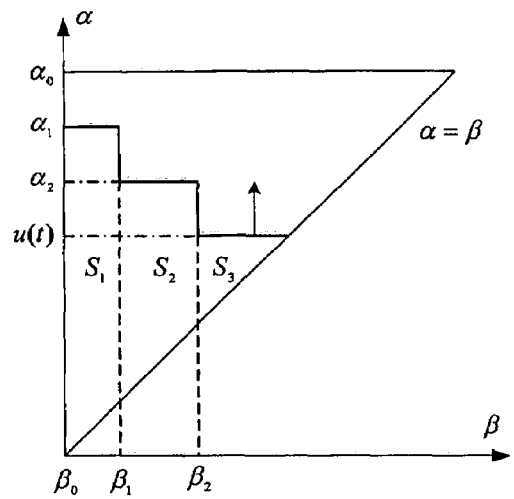
FIG. 6A(Prior Art)   FIG. 6B(Prior Art)
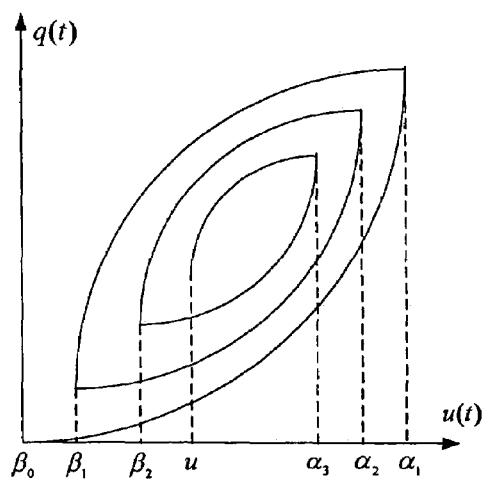
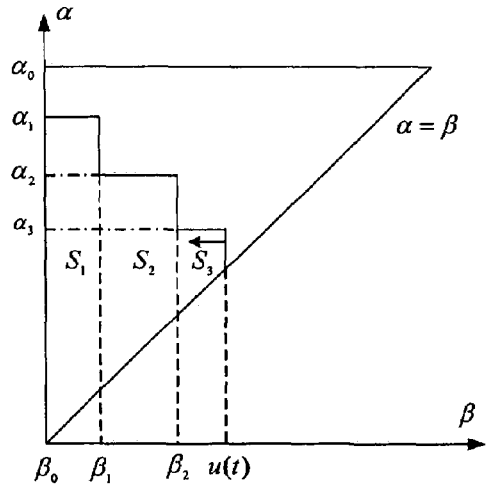
FIG. 7A(Prior Art)   FIG. 7B(Prior Art)

NONLINEAR HYSTERESIS CONTROL SYSTEM

BACKGROUND OF THE INVENTION

1. Field of the Invention

The present invention relates to a nonlinear hysteresis control system for controlling an actuator, especially for a nanoscale actuator, such as made by piezoelectric ceramics, magnet, and quartz.

2. Description of the Related Art

The actuators made of, for example, piezoelectric ceramics, magnet, and quartz, etc. will present nonlinear hysteresis effect that may create difficulty for various control applications.

FIG. 1 shows a typical close-loop controller 90 which includes a computer 91, a D/A Converter 92, an amplifier 93 for outputting voltage and a measurement sensor 99. A user uses the computer 91 as an interface and applies a voltage on an actuator 94. The displacement of the actuator 94 will change due to different applied voltage, then the actuator 94 can move a working platform 95 (e.g. DNA inspection device). The displacement of the actuator 94/working platform 95 can be measured by the measurement sensor 99, so the user can adjust the output voltage to adjust the desired displacement of the actuator 94. However, the nanoscale measurement sensor 99 is extremely expensive, and therefore, referring to FIG. 2, a well-known open-loop controller 90a without the need measurement sensor 99 is developed and implemented as a feed forward controller. The control scheme is depicted in FIG. 3. A desired trajectory x(t) (i.e. a plurality of desired time corresponding to the plurality of desired displacement) is calculated by the well-known "inverse Preisach model algorithm codes 31a", and appropriate applied voltage u(t) is computed to implement on the actuator 94 and the output displacement y(t) is then obtained.

To use "inverse Preisach model algorithm codes 31a", the hysteresis effect profile 20a of the actuator 94 must be built (measured in advance) or recorded by the user is stored in the computer 91a. The hysteresis effect profile 20a can include various kinds of piezoelectric ceramics, magnet, and quartz, etc. in market, so that the user can use many type of actuators as long as corresponding profiles are stored in the computer 91a.

The following paragraphs will briefly describe the classical Preisach Model and classical hysteresis effect profile hereafter so that the present invention can be understood well. Please also refer to "Mayergoyz, Mathematical Models of Hysteresis, Springer Verlag, New York, 1991." for details

Preisach Model and Classical Hysteresis Effect Profile:

Hysteresis exists in the piezoelectric ceramics so that it increases the difficulty of controller design. To overcome this problem, a numerical Preisach model for describing the hysteresis of piezoelectric actuators is used. FIG. 4 shows an input-output diagram of the hysteresis operator, $\gamma_{\alpha\beta}$, defined with a value of 1 or 0. Parameters $\alpha$ and $\beta$ correspond to the "up" and "down" switching values of the input voltage u(t). As u(t) increases to be greater than $\alpha$, then $\gamma_{\alpha\beta}$ is switched from 0 to 1. On the contrary, u(t) decreases to be smaller than $\beta$, then $\gamma_{\alpha\beta}$ is switched from 1 to 0.

The Preisach model is expressed as follows:

$$q(t)=\iint_{\alpha \geq \beta} \mu(\alpha,\beta)\gamma_{\alpha\beta}[u(t)]d\alpha d\beta \quad (1)$$

where q(t) is the actuator displacement with respect to its natural length, and $\mu(\alpha,\beta)$ is a weight function in the Preisach model. FIG. 5 illustrates how the Preisach works, where $T_0$ represents the limiting triangle corresponding to the maximal displacement of the actuator. When the input voltage starts to increase from zero to some value $u_1$, all hysteresis operators $\gamma_{\alpha\beta}$ with switching values $\alpha$ less than $u_1$ are switched to the "up" position in the region $S^+$ as shown in FIG. 5A. As the input voltage starts to decrease from $u_1$ to $u_2$, all hysteresis operators $\gamma_{\alpha\beta}$ with switching values $\beta$ larger than $u_2$ are switched to the "down" position, and the region $S^+$ will be decreased as shown in FIG. 5B. Note that, all hysteresis operators have the value of 1 in the region $S^+$, and the value of 0 in the region $S^0$.

Thus, equation (1) can be adapted to be $$q(t)=\iint_{S^+} \mu(\alpha,\beta)\gamma_{\alpha\beta}[u(t)]d\alpha d\beta \quad (2)$$

The weight function $\mu(\alpha,\beta)$ is usually determined empirically by a series of increasing and then decreasing inputs to the actuator. It can be identified by differentiating equation (2) twice, and then evaluate the measured data.

Concerning an arbitrary input history shown in FIG. 6A and its corresponding diagram in the $\alpha$-$\beta$ plane shown in FIG. 6B, the displacement of an actuator can be expressed below.

$$q(t)=\iint_{S1} \mu(\alpha,\beta)\gamma_{\alpha\beta}[u(t)]d\alpha d\beta$$
$$+\iint_{S2} \mu(\alpha,\beta)\gamma_{\alpha\beta}[u(t)]d\alpha d\beta+\iint_{S3} \mu(\alpha,\beta)\gamma_{\alpha\beta}[u(t)]d\alpha d\beta$$
$$\underline{\Delta}[X(\alpha_1,\beta_0)-X(\alpha_1,\beta_1)]+[X(\alpha_2,\beta_1)-X(\alpha_2,\beta_2)]+X(u(t),\beta_2) \quad (3)$$

where X(.) is called the Preisach function. Equation (3) can be rearranged to have $$q(t) = \sum_{k=1}^{n-1} [X(\alpha_k, \beta_{k-1}) - X(\alpha_k, \beta_k)] + X(u(t), \beta_{n-1}) \quad (4)$$

For example, $X(\alpha,\beta)=q_\alpha - q_{\alpha\beta}$, where $q_\alpha$ is the measured displacement after the input voltage is increased from 0 to $\alpha$ and $q_{\alpha\beta}$ is the measured displacement after the input voltage is decreased from $\alpha$ to $\beta$.

Another case for the input voltage u(t) on the descending curve shown in FIG. 7, the equation (4) can be expressed as $$q(t) = \sum_{k=1}^{n-1} [X(\alpha_k, \beta_{k-1}) - X(\alpha_k, \beta_k)] + [X(\alpha_n, \beta_{n-1}) - N(\alpha_n, u(t))] \quad (5)$$

To implement the Preisach model, the classical hysteresis effect profile 20a (Preisach functions) are measured experimentally from the piezoelectric actuators for different combinations of $(\alpha,\beta)$, which shown in FIG. 8. For points of the $(\alpha,\beta)$ plane lying within any of the squares or triangles, the bilinear spline interpolation can be used to solve the problems.

For example, the displacement of points a, b, and c can be represented as (1) Point a: the displacement after the input voltage is increased from 0V to 60V $$q_a = X(60,0)$$

(2) Point b: the displacement after the input voltage is increased from 0V to 105V, and then decreased from 105V to 90V $$q_b = X(105,0) - X(105,90)$$

(3) Point c: the displacement after the input voltage is increased from 0V to 135V, decreased from 135V to 45V, and then increased from 45V to 120V $$q_c = [X(135,0) - X(135,45)] + X(120,45)$$

Please note, FIG. 8 as an example:

$\alpha_0=0$, $\alpha_1=15$, $\alpha_2=30$, ... $\alpha_{10}=150$ $\beta_0=0$, $\beta_1=15$, $\beta_2=30$, ... $\beta_{10}=150$ Because $X(\alpha,\beta)$ means "the displacement after the input voltage is increased from 0 to $\alpha$"

Minus

"the displacement after the input voltage is decreased from $\alpha$ to $\beta$"

Therefore, $\alpha > \beta$.

So, the value of $X(\alpha,\beta)$ only exists on the upper triangle area, which means the classical hysteresis effect profile 20*a* only memorizes the meshed nodal points.

In addition, when $\alpha=\beta$, $X(\alpha,\beta)=0$

Please also note that when $\beta=0$, $X(\alpha,0)$ means "the displacement after the input voltage is increased from 0 to $\alpha$"

Although the classical Preisach model claims that the experiment must be under the condition of very slow motion; however, in fact, the displacement output would not be zero, which is shown in FIG. 9. The establishment of hysteresis model by use of classical Preisach model may be inaccurate. In other words, in the classical Preisach model, the classical hysteresis effect profile 20*a* only memorizes "the displacement after the input voltage is increased from 0 to $\alpha$", and does not memorize "the displacement after the input voltage is increased from 0 to $\alpha$, and then decreased from $\alpha$ to 0.

Therefore, when the experiment is not under the condition of very slow motion of the actuator, the classical Preisach model will be failed.

Furthermore, under the different speed of actuator's motion, the hysteresis effect profile should be different.

SUMMARY OF THE INVENTION

The object of the present invention is to provide a solution to solve the above mentioned problem of the classical Preisach model. Because the original "inverse Preisach model algorithm" derived from the classical Preisach model is easy for calculation purpose, another object the present invention is still using the original "inverse Preisach model algorithm".

To achieve these objects, the nonlinear hysteresis control system for controlling an actuator with nonlinear hysteresis effect comprises a processor, an input device, and a storage device which stores a least one set of extended hysteresis effect profile for the actuator. A user can use the input device to create a plurality of desired displacement of the actuator and a plurality of desired time corresponding to the plurality of desired displacement.

The storage device also stores a program for controlling the processor so that the processor operatives with the program, the plurality of desired displacement, and the plurality of desired time and the extended hysteresis effect profile to control the actuator. The program uses an inverse Preisach model algorithm codes for numerical calculation such that a plurality of output voltage corresponding to the plurality of desired displacement is generated.

The extended hysteresis effect profile comprises:

(1) a plurality displacement value defined as $X(\alpha p, \beta q-1)$, wherein:

p=1~n, and q=1~p;

$\alpha p$ and $\beta q-1$ present a specific voltage applied on the actuator, wherein $\alpha p=\beta p$, $\alpha p > \alpha p-1$, $\beta q > \beta q-1$, and $\beta 0=0$ voltage;

$X(\alpha p, \beta q-1)$ present the displacement when a applied voltage of the actuator 50 is from 0 voltage to $\alpha p$ and back to $\beta q-1$;

(2) a plurality displacement value defined as $X(\alpha p, \beta-1)$, wherein:

p=1~n;

$X(\alpha p, \beta-1)$ present the displacement when a applied voltage on the actuator 50 is from 0 voltage to $\alpha p$.

(3) a plurality displacement value defined as $X(\alpha p, \beta p)$, wherein:

p=0~n;

$\alpha p=\beta p$; and $X(\alpha p, \beta p)=0$.

The extended hysteresis effect profile can be multiple sets due to different change rate of applied voltage on the actuator, or different model/type of the actuator.

Other objects, advantages, and novel features of the invention will become more apparent from the following detailed description when taken in conjunction with the accompanying drawings.

BRIEF DESCRIPTION OF THE DRAWINGS

FIG. 4 shows a an input-output diagram of the hysteresis operator.

FIG. 5A shows a schematic drawing of how the Preisach works when input voltage starts to increase from zero to some value $u_1$.

FIG. 5B shows a schematic drawing of how the Preisach works when input voltage decrease from $u_1$ to $u_2$.

FIG. 6A shows a schematic drawing of Hysteresis Loop for increasing voltage.

FIG. 6B shows the corresponding diagram in the $\alpha$-$\beta$ plane of FIG. 6A.

FIG. 7A shows a schematic drawing of Hysteresis Loop for decreasing voltage.

FIG. 7B shows the corresponding diagram in the $\alpha$-$\beta$ plane of FIG. 7A.

DETAILED DESCRIPTION OF THE PREFERRED EMBODIMENT

Figure 10:
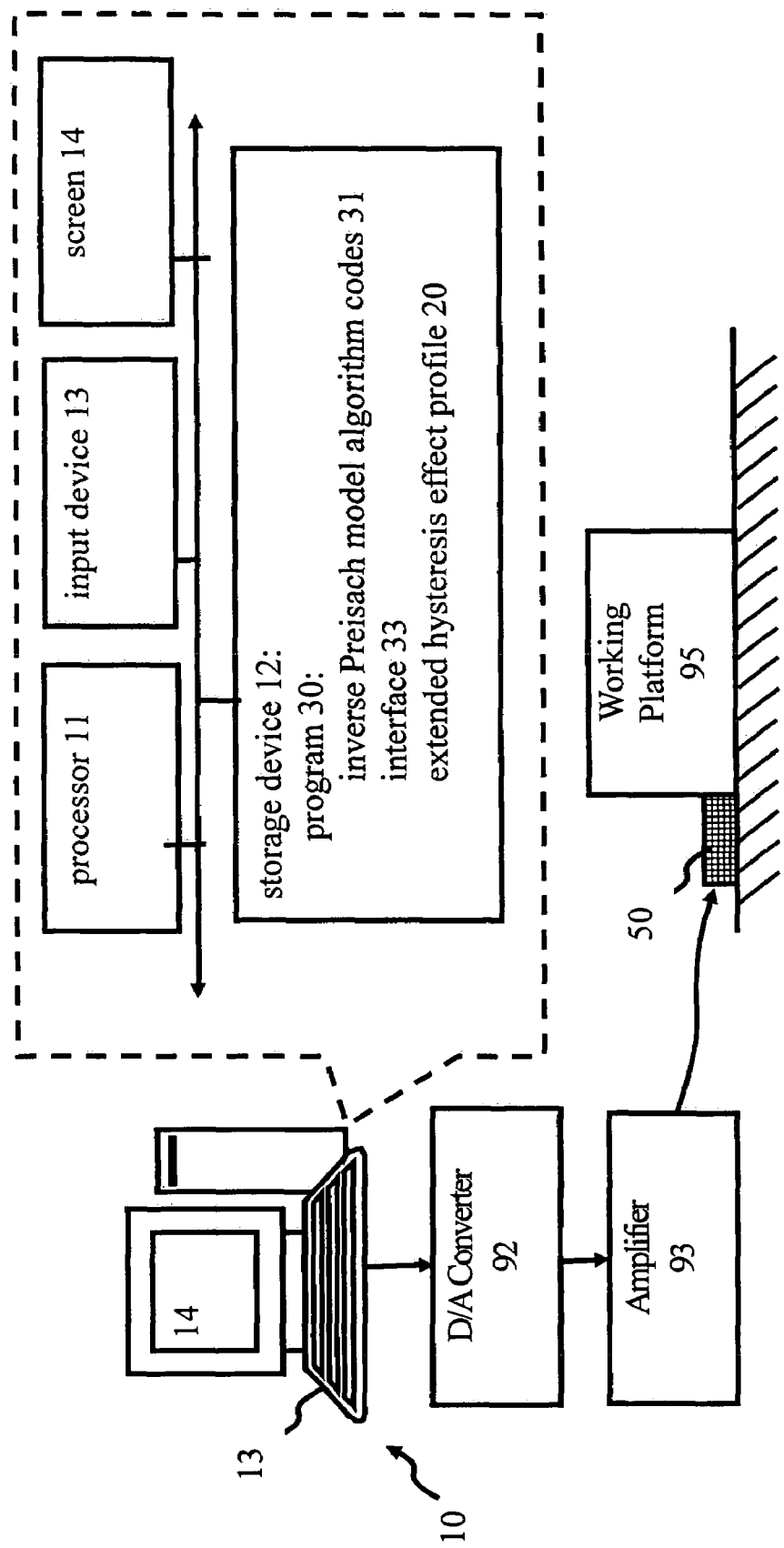
FIG. 10 shows a schematic drawing of a nonlinear hysteresis control system 10 according to the present invention.

Please refer to FIG. 10 for the nonlinear hysteresis control system 10 of the present invention. The nonlinear hysteresis control system 10 like the prior art can be a computer which includes a processor 11, a storage device 12 (e.g. memory, hard disk) electrically connected to the processor 11, an input device 13 electrically connected to the processor 11, a D/A converter 92, an amplifier 93 for outputting voltage to an actuator 50. Please noted that the D/A converter 92 and the amplifier 93 may be omitted if the hardware of the nonlinear hysteresis control system 10 is a special made computer which internally has the same or similar function of the D/A converter 92 and the amplifier 93.

The storage device 12 comprises a program 30 for controlling the processor 11. The program 30 includes a least one set of extended hysteresis effect profile 20, and an inverse Preisach model algorithm codes 31 for numerical calculation.

Figure 1:
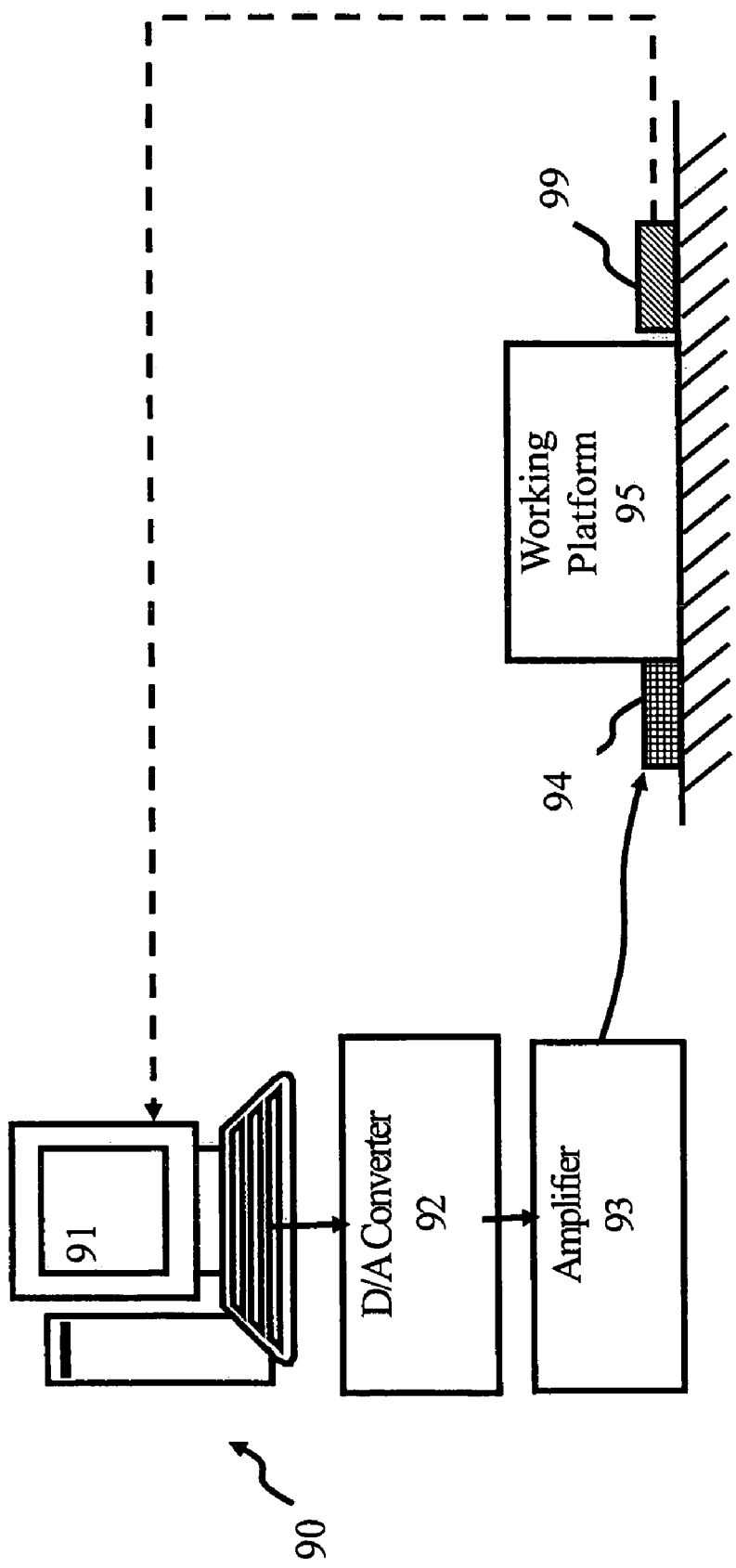
FIG. 1 shows a schematic drawing of a prior art close-loop controller.
Figure 2:
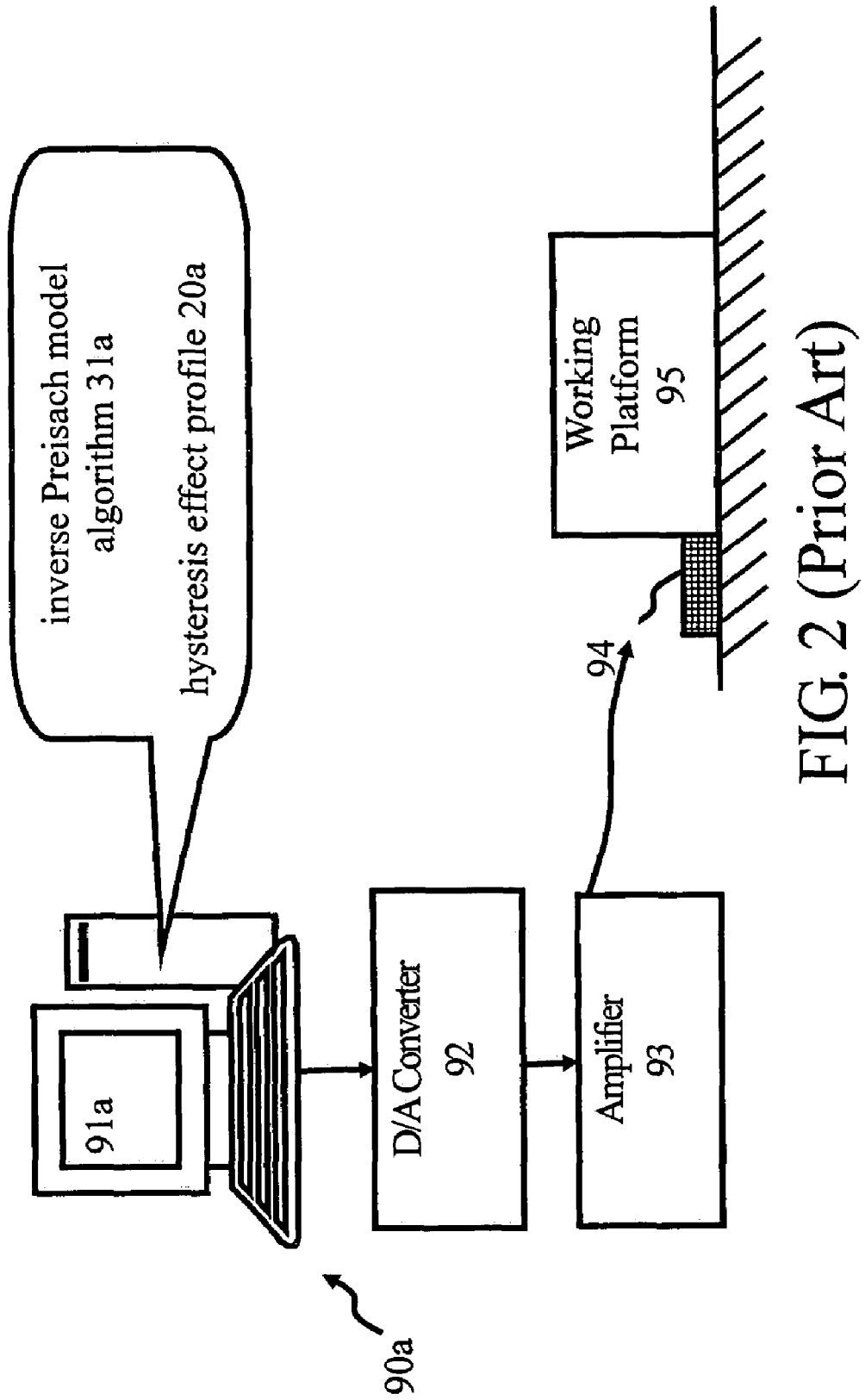
FIG. 2 shows a schematic drawing of a prior art open-loop controller.
Figure 3:
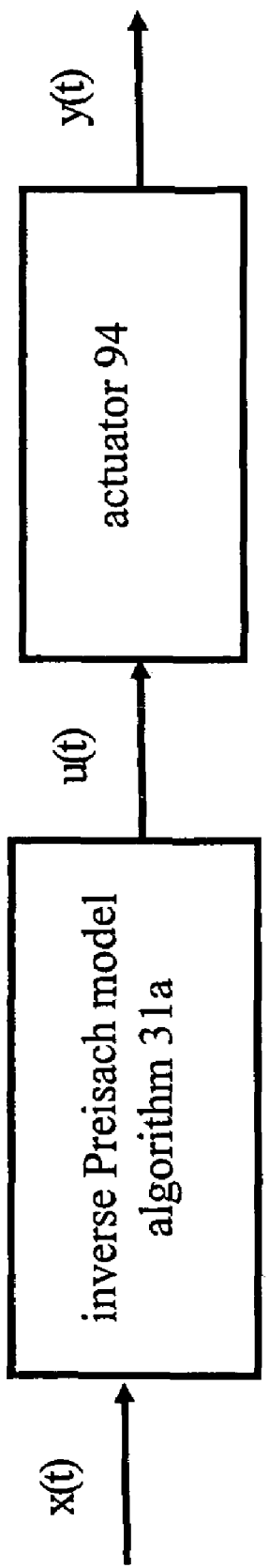
FIG. 3 shows the control scheme according to the open-loop controller of FIG. 2.
Figures 9, 11:
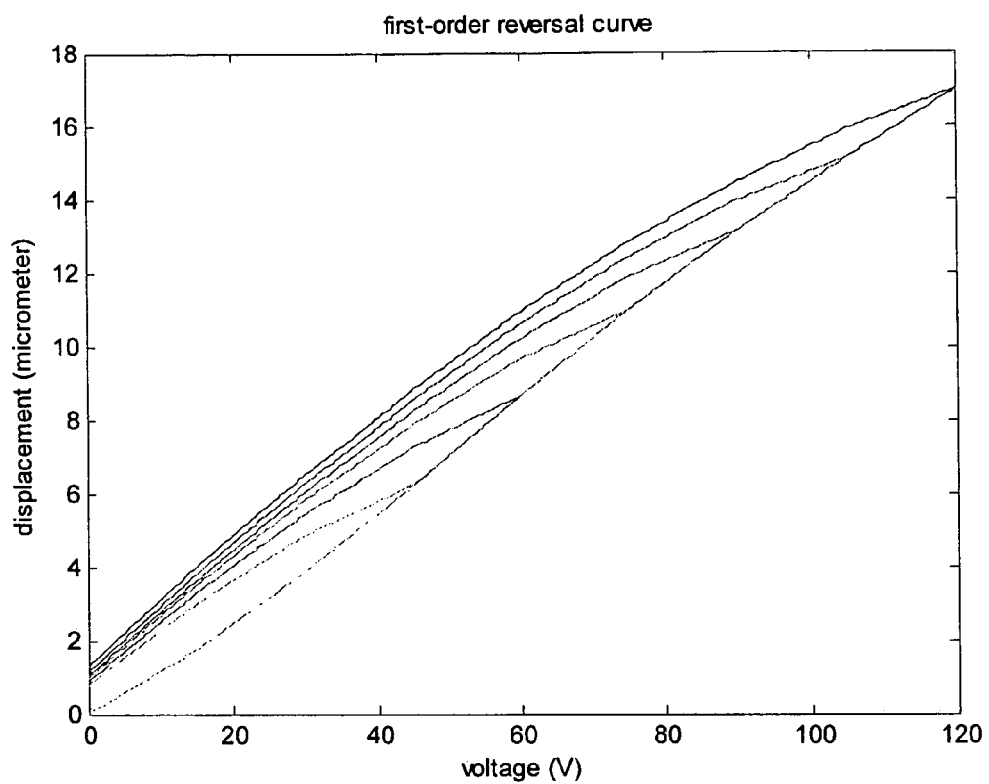
FIG. 9 shows an experimental embodiment to explain the hysteresis effect.
FIG. 11 shows a schematic table regarding a plurality desired time, a plurality of corresponding desired displacement and a plurality of corresponding output voltage.

As mentioned in the background of the invention, a desired trajectory x(t) should be input in advanced. Therefore an interface 33 and a screen 14 preferred to be required, so that, please referring to FIG. 11, a user can use the input device 13 with the help of the interface 33 to create a plurality of desired displacement 42 of the actuator 50 and a plurality of desired time 41 corresponding to the plurality of desired displacement 42. The function of inverse Preisach model algorithm codes 31 is to precede the numerical calculation such that a plurality of output voltage 43 corresponding to the plurality of desired displacement 42 is generated. For example, at the time t2, the desired displacement is x(t2). By using the inverse Preisach model algorithm codes 31, the output voltage 43 u(t2) will be applied on the actuator 50 to have the desired displacement x(t2). Please also refer the FIG. 3 again. With regard to the well-known inverse Preisach model algorithm, please refer "(1) Y Ting, H. -C. Jar, C. -C. Li, "Error Compensation and Feedforward Controller Design for A 6-dof Micro-positioning Platform," *IEEE/IRSJ International Conf. on Intelligent Robots and Systems* (*IROS*), pp. 766-771, August 2005. (2) Y Ting, H. -C. Jar, and C. -C. Li, "Measurement and Calibration for Stewart Micromanipulation System," *Journal of Precision Engineering*, 2006. (accepted and in Press)" for details. However, brief descriptions will be listed hereafter.

Figure 8:
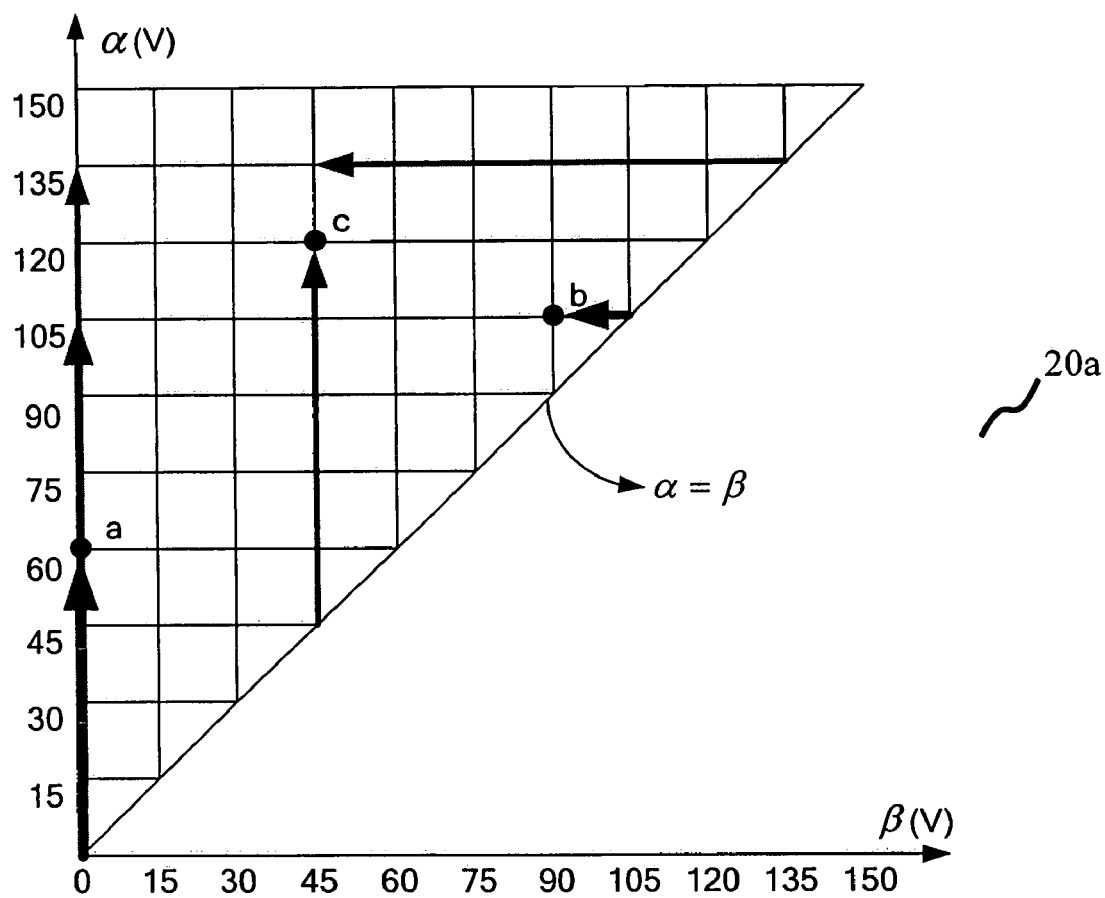
FIG. 8 shows a schematic drawing of a classical hysteresis effect profile.

The subject matter of the present invention is to provide a modified hysteresis effect profile, defined as an extended hysteresis effect profile 20. Please refer to FIG. 12 which is modified from FIG. 8.

Figure 12:
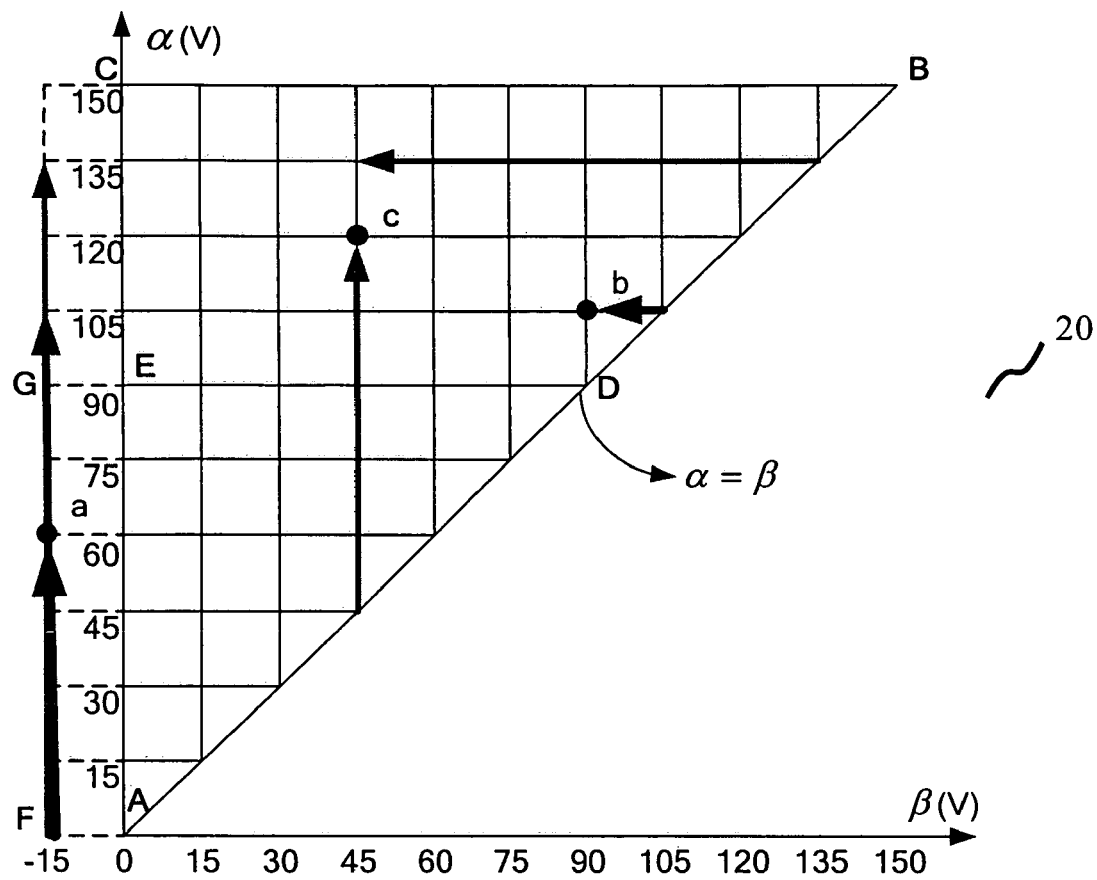
FIG. 12 shows a schematic drawing of an extended hysteresis effect profile according to the present invention.

A column vector illustrated with dashed line is added to the left side of the α(v) coordinate to record the value of a "virtual" applied voltage, for example, -15V in FIG. 12. Thus, the initial applied voltage for the hysteresis model is given by $(\alpha,\beta)=(0,-15)$. The integration area is the trapzoidal ADGF while the applied voltage is from 0V to 90V and is defined by $(\alpha,\beta)=(90,-15)$. Under such condition, the residual integration area will be left as AEGF while the applied voltage is reduced from 90V to 0V. The residual area implicates that the integration area is not zero. Thus, it can appropriately describe the characteristics of energy storage element for those piezoelectric ceramics, magnet, or quartz devices.

If we use the classical hysteresis effect profile as a comparison, for example, the integration of the area of triangle ADE to obtain the corresponding displacement for the applied input voltage from 0V to 90V and back to 0V will have zero displacement for the limited triangle. However, as mentioned on the previous paragraph, the residual integration area will be left as AEGF according to the extended hysteresis effect profile 20.

To describe the extended hysteresis effect profile 20 clearly, for example, the displacement of points a, b, and c can be represented as (1) Point a: the displacement after the input voltage is increased from 0V to 60V $$q_a = X(60,-15)$$

(2) Point b: the displacement after the input voltage is increased from 0V to 105V, and then decreased from 105V to 90V $$q_b = X(105,-15) - X(105,90)$$

(3) Point c: the displacement after the input voltage is increased from 0V to 135V, decreased from 135V to 45V, and then increased from 45V to 120V $$q_c = [X(135,-15) - X(135,45)] + X(120,45)$$

Figure 13:
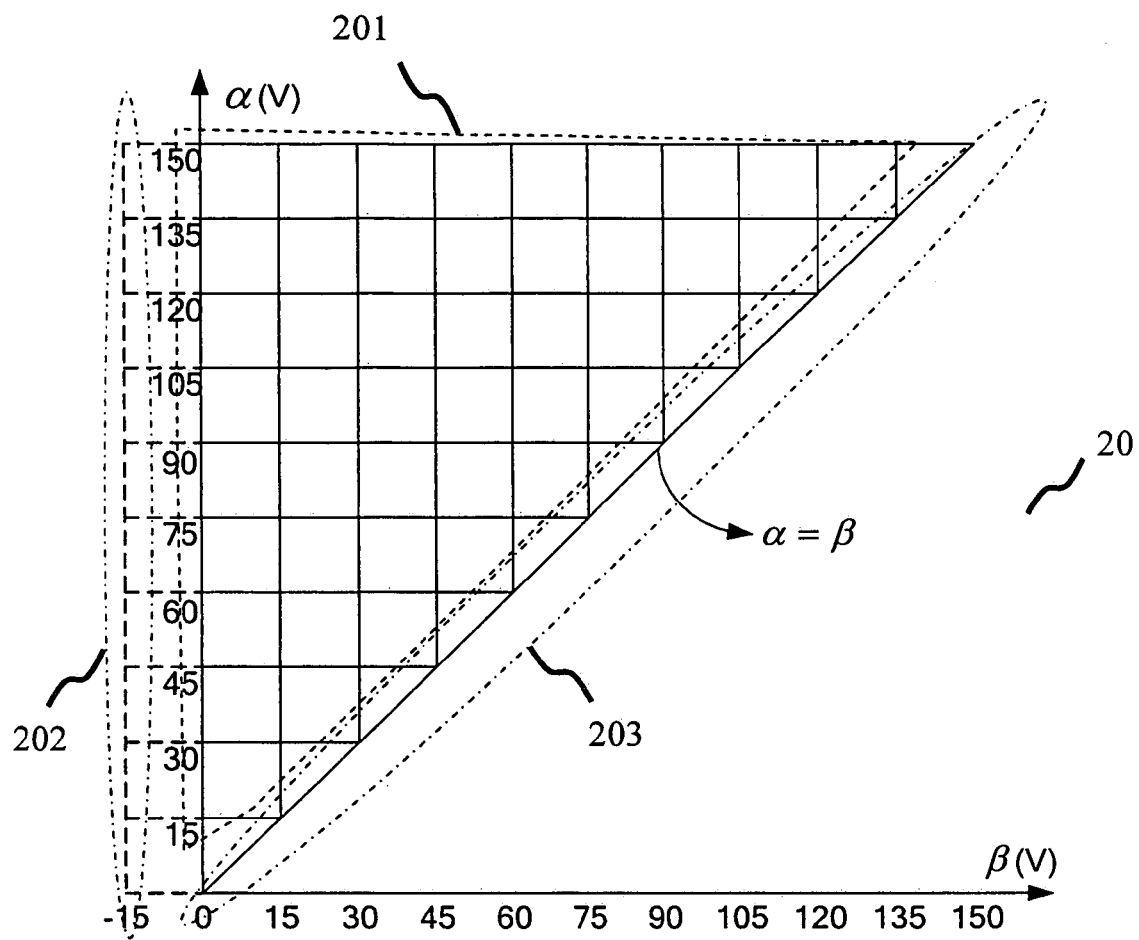
FIG. 13 shows a schematic drawing of an extended hysteresis effect profile, showing three different dot areas for three groups of displacement values.

The mathematic description for the extended hysteresis effect profile 20 can be defined as follows:

The extended hysteresis effect profile 20 comprises:

(1) Please refer to the dot area 201 of FIG. 13: a plurality displacement value defined as $X(\alpha p, \beta q-1)$, wherein:☐ p=1~n, and q=1~p;

αp and βq-1 present a specific voltage applied on the actuator, wherein αp=βp, αp>αp-1, βq>βq-1, and β0=0 voltage;

$X(\alpha p, \beta q-1)$ present the displacement when a applied voltage of the actuator 50 is from 0 voltage to αp and back to βq-1;

(2) Please refer to the dot area 202 of FIG. 13: a plurality displacement value defined as $X(\alpha p, \beta-1)$, wherein: p=1~n;

$X(\alpha p, \beta-1)$ present the displacement when a applied voltage on the actuator 50 is from 0 voltage to αp.

(3) Please refer to the dot area 203 of FIG. 13: a plurality displacement value defined as $X(\alpha p, \beta p)$, wherein: p=0~n;

αp=βp; and $X(\alpha p, \beta p)=0$.

Please note that the value is zero for $X(\alpha p, \beta p)$ when αp=βp, so these displacement values are not necessary stored in the extended hysteresis effect profile 20. When these displacement values are not necessary stored, many algorithms can be used to solve these problems. For example, hypothetical codes are shown as follows:

if αp=βp, if yes, then $X(\alpha p, \beta p)=0$, if not, then retrieving the value stored in the extended hysteresis effect profile.

Figure 14:
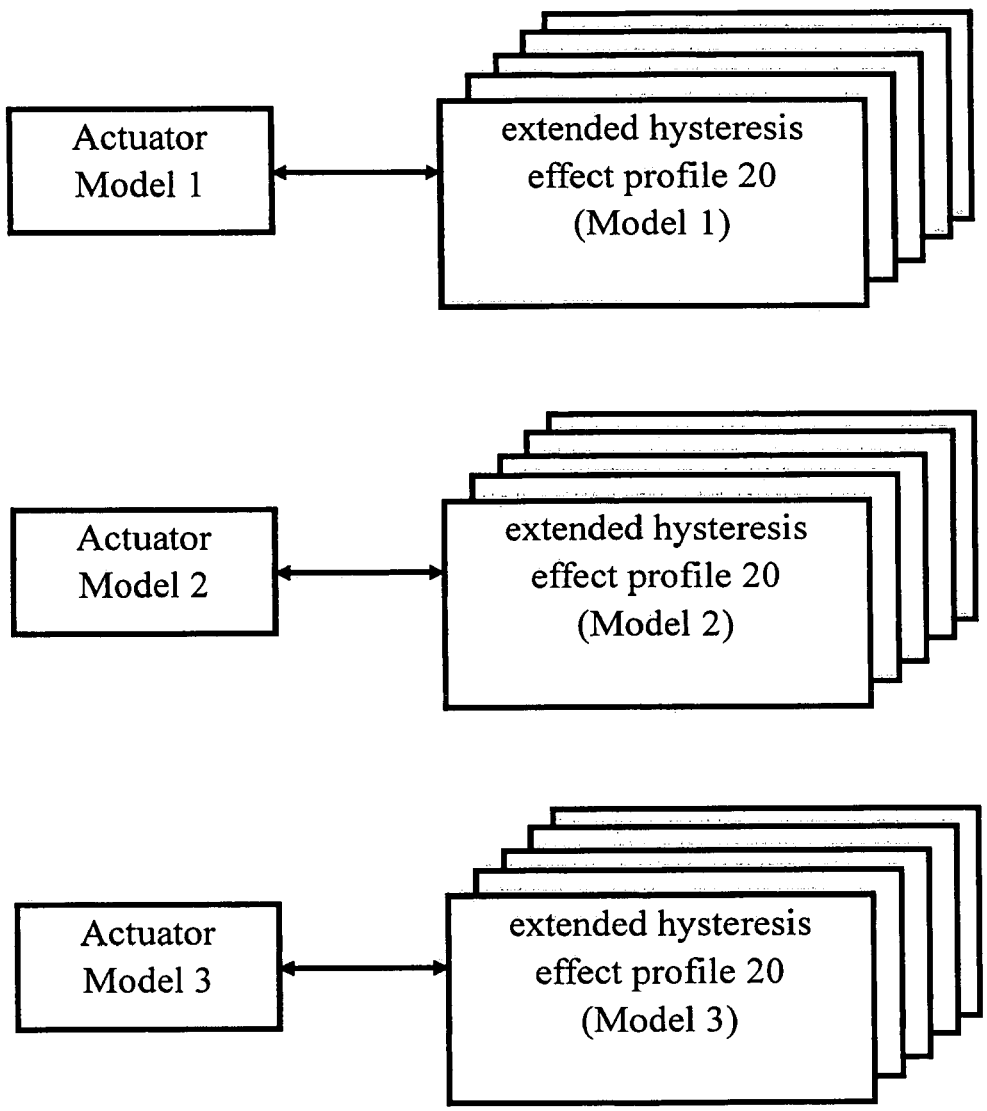
FIG. 14 shows a schematic drawing of multiple sets of the extended hysteresis effect profiles 20 due to different change rate of applied voltage and different models of actuators.

As mentioned in the background of the invention, the classical Preisach model is under the condition of very slow motion, so each actuator only need one set of the classical hysteresis effect profile 20a. Referring to FIG. 14, since the extended hysteresis effect profile 20 is built under not very slow motion, so multiple sets of the extended hysteresis effect profiles 20 can be built according to different change rate of applied voltage on the actuator 50. For example, multiple sets of the extended hysteresis effect profiles 20 (model 1) are built for the actuator (model 1).

In addition, please also referring to FIG. 14, to apply different models/types of actuators for nonlinear hysteresis control system 10, multiple sets of the extended hysteresis effect profiles 20 are also required.

Figure 15:
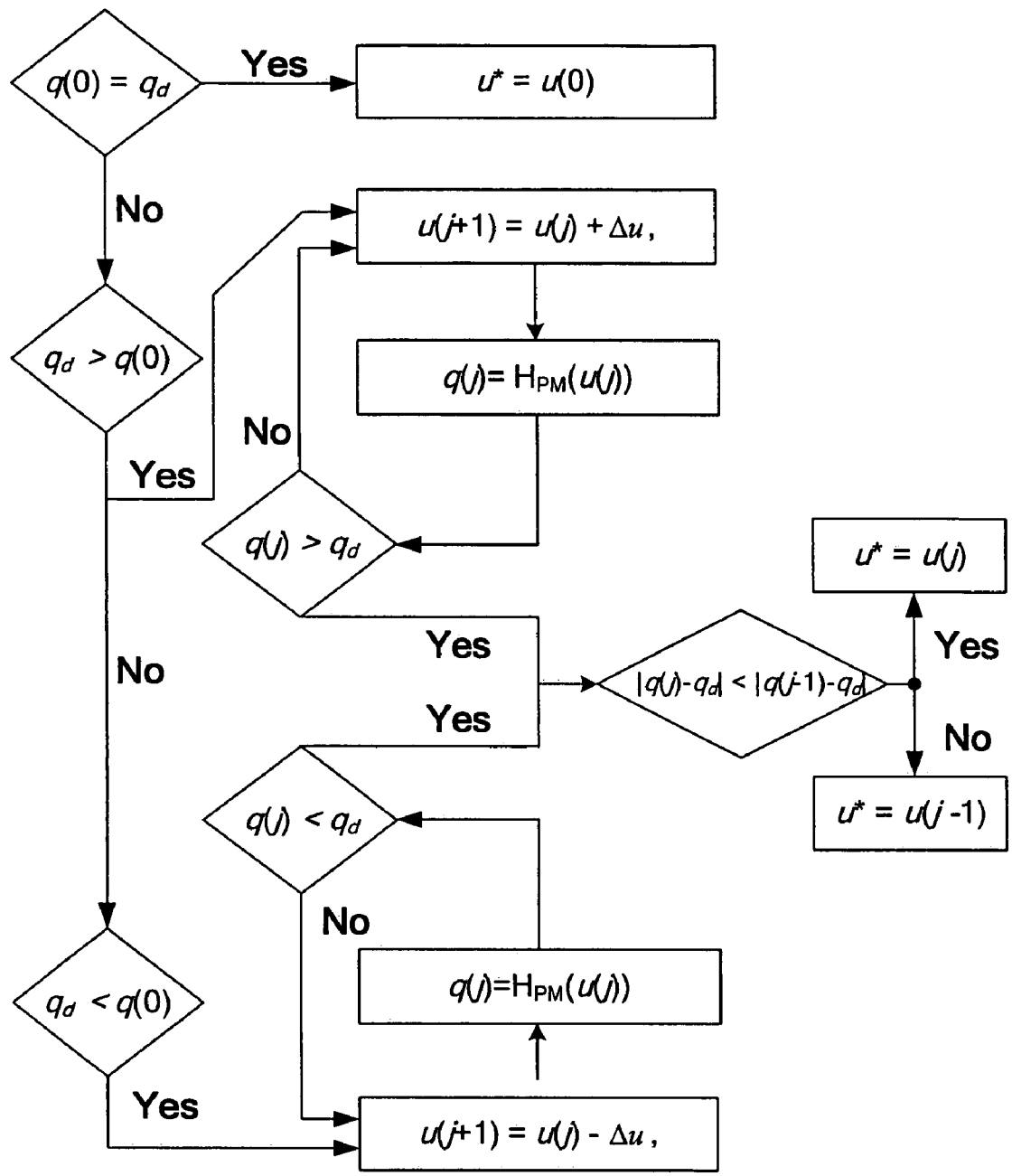
FIG. 15 shows the flow chart of the inverse Preisach model algorithm.

The following algorithm for numerical calculation can describe the inverse Preisach model, and its flow chart is shown in FIG. 15. Note that, u(t) is the (current) input voltage; q(t) is the output displacement of the actuator; $q_d$ is the desired displacement of the actuator; $H_{PM}$ is the Preisach model.

The well known inverse Preisach model algorithm codes 31 is briefly introduced as follows, and please also refer to the flow chart shown in the FIG. 15. Note that, u(t) is the (current) input voltage; u* is the predicted value by inverse Preisach model; q(t) is the output displacement of the actuator; $q_d$ is the desired displacement of the actuator; $H_{PM}(u(j))$ is the Preisach model for computing the output displacement q(j) relative to the input voltage u(j) by means of equation (4) for ascending voltage and equation (5) for descending voltage respectively. Please refer to the paragraph of "Description of the Related Art" for equation (4) and (5).

(1) Set j=0, if q(0)=$q_d$, let u*=u(0), [It means the current output is equal to the desired output, and the predicted input is assigned with the current input.]; If $q_d$>q(0), go to step (2), If $q_d$<q(0), go to step (3)

(2) If $q_d$>q(0), i.e., q(0) is expected to increase, then
  (2a) Set u(j+1)=u(j)+Δu,j=j+1 [It changes the temporarily predicted input to next interval, and stores the historical curve.]
  (2b) Compute q(j)=$H_{PM}$(u(j)); if q(j)>$q_d$, go to step (2c); otherwise, back to step (2a). [It computes the relative output by Preisach model.]
  (2c) If |q(j)−$q_d$|<|q(j−1)−$q_d$|, let u*=u(j); otherwise, let u*=u(j−1), [It attempts to search an ideal input voltage u*.]

(3) If $q_d$<q(0), i.e., q(0) is expected to decrease, then
  (3a) Set u(j+1)=u(j)−Δu,j=j+1. [It changes the temporarily predicted input to previous interval.]
  (3b) Compute q(j)=$H_{PM}$(u(j)), if q(j)<$q_d$, go to step (3c); otherwise, back to step (3a). [It computes the relative output by Preisach model.]
  (3c) If |q(j)−$q_d$|<|q(j−1)−$q_d$|, let u*=u(j); otherwise, let u*=u(j−1). [It attempts to search an ideal input voltage u*.]

As mentioned as above, since the inverse Preisach model algorithm is well known, the details of the inverse Preisach model algorithm is not explained hereafter Although the present invention has been explained in relation to its preferred embodiment, it is to be understood that many other possible modifications and variations can be made without departing from the spirit and scope of the invention as hereinafter claimed.

ELEMENT DESCRIPTION nonlinear hysteresis control system 10
processor 11
storage device 12
input device 13
screen 14
extended hysteresis effect profile 20
hysteresis effect profile 20a
dot area 201, 202, 203
program 30
inverse Preisach model algorithm codes 31, 31a
interface 33
desired time 41
desired displacement 42
output voltage 43
actuator 50
close-loop controller 90, 90a
computer 91, 91a
D/A converter 92
amplifier 93
actuator 94
Working Platform 95
measurement sensor 99

What is claimed is:

1. A nonlinear hysteresis control system for controlling an actuator with nonlinear hysteresis effect, comprising:
  a processor;
  a storage device electrically connected to the processor, wherein the storage device stores a least one set of extended hysteresis effect profile for the actuator;
  an input device electrically connected to the processor, so that a user can use the input device to create a plurality of desired displacement of the actuator and a plurality of desired time corresponding to the plurality of desired displacement;
  the storage device storing a program for controlling the processor and the processor operative with the program, the plurality of desired displacement, the plurality of desired time and the extended hysteresis effect profile to control the actuator, wherein the program uses an inverse Preisach model algorithm codes for numerical calculation such that a plurality of output voltage corresponding to the plurality of desired displacement is generated;
  the nonlinear hysteresis control system characterized in that:
  the extended hysteresis effect profile comprises:
    (1) a plurality displacement value defined as X(αp, βq−1), wherein:
      p=1~n, and q=1~p;
      αp and βq−1 present a specific voltage applied on the actuator, wherein αp=βp, αp>αp−1, βq>βq−1, and β0=0 voltage;
      X(αp, βq−1) present the displacement when a applied voltage of the actuator is from 0 voltage to αp and back to βq−1;
    and
    (2) a plurality displacement value defined as X(αp, β−1), wherein:
      p=1~n;
      X(αp, β−1) present the displacement when a applied voltage on the actuator is from 0 voltage to αp.

2. The nonlinear hysteresis controller as claimed in claim 1, wherein the hysteresis effect profile further stores:
  (3) a plurality displacement value defined as X(αp, βp), wherein:
    p=0~n;
    αp=βp; and
    X(αp, βp)=0.

3. The nonlinear hysteresis controller as claimed in claim 1, wherein the actuator is made of piezoelectric ceramics, magnet, or quartz.

4. The nonlinear hysteresis controller as claimed in claim 1, wherein the storage device further stores a least two different sets of hysteresis effect profile of the actuator, each set of hysteresis effect profile represents a specific change rate of applied voltage on the actuator.

5. The nonlinear hysteresis controller as claimed in claim 1, wherein the storage device further stores a least two different sets of hysteresis effect profile of the actuator, each set of hysteresis effect profile represents a specific model/type of the actuator.

6. An extended hysteresis effect profile for a nonlinear hysteresis control system used for controlling an actuator with nonlinear hysteresis effect, comprising:
- (1) a plurality displacement value defined as $X(\alpha p, \beta q-1)$, wherein:
  - $p=1\sim n$, and $q=1\sim p$;
  - $\alpha p$ and $\beta q-1$ present a specific voltage applied on the actuator, wherein $\alpha p=\beta p$, $\alpha p>\alpha p-1$, $\beta q>\beta q-1$, and $\beta 0=0$ voltage;
  - $X(\alpha p, \beta q-1)$ present the displacement when a applied voltage of the actuator is from 0 voltage to $\alpha p$ and back to $\beta q-1$;

and
- (2) a plurality displacement value defined as $X(\alpha p, \beta-1)$, wherein:
  - $p=1\sim n$;
  - $X(\alpha p, \beta-1)$ present the displacement when a applied voltage on the actuator is from 0 voltage to $\alpha p$.

7. The extended hysteresis effect profile as claimed in claim 6, wherein the hysteresis effect profile further comprises:
- (3) a plurality displacement value defined as $X(\alpha p, \beta p)$, wherein:
  - $p=0\sim n$;
  - $\alpha p=\beta p$; and
  - $X(\alpha p, \beta p)=0$.

\* \* \* \* \*